United States Patent Office 2,963,350
Patented Dec. 6, 1960

2,963,350

BLOOD SUGAR TEST

Harry Gold, Box No. PMB 19312, Lewisburg, Pa.

No Drawing. Filed Sept. 1, 1959, Ser. No. 837,336

6 Claims. (Cl. 23—230)

The present invention relates to a new and improved blood sugar test and is more particularly concerned with the provision of a blood sugar test procedure which is safe, extremely rapid, accurate and low in cost, one in which capillary blood may be used, and one which may be employed even in isolated areas where electricity is unavailable.

The new blood sugar test procedure is based, in accordance with the present invention, upon the surprising discovery that alkali metal salts such as sodium or potassium salts, of indigo sulfonic acids, such as di, tri, tetra and other indigo sulfonic acids, commonly referred to simply as indigo sulfonates, including the less pure indigo carmine, provide color indicators whereby chronometric quantitation of the indigo sulfonate-glucose reaction may be determined and whereby a sharp, distinctive endpoint, capable of being read to a fraction of a second, may be achieved.

It is true that indigo disulfonate has been used heretofore as a test for glucose, but this test was solely a qualitative one, merely to detect the presence of glucose. A very brief description of the qualitative test is found in Dorland's "American Illustrated Medical Dictionary," 22nd ed., 1951, W. B. Saunders Co., Philadelphia 5, Pennsylvania, p. 1544. However, no mention or remote suggestion is given to the effect that indigo sulfonates could be employed for quantitative glucose determination. As a matter of fact, the color changes mentioned by Dorland are completely different from those described hereinbelow.

The process of the present invention is characterized by at least five important features.

The test can be carried out very rapidly. As a matter of fact, a single test can be performed in 4 minutes or less, including the obtaining of the capillary blood, as contrasted with 30 minutes for the conventional Folin-Wu method. This is of the greatest value when a patient is brought into a hospital in either diabetic coma or insulin shock, or in distinguishing between the two states: See Bodansky and Bodansky, "Biochemistry of Disease," 2nd edition, 1949, pp. 516 and 517, particularly the last paragraph on p. 517. This book is published by the Macmillan Co., 60 Fifth Avenue, New York 11, New York.

This 4-minute time comes down considerably when two or more tests are performed at one time. Also, as one obtains more experience with the method, test may be carried out on blood sugar in 3 minutes.

Because of its rapidity, the test lends itself to being done while the patient is undergoing examination by the doctor. If the test is performed say two hours after a meal, a glucose tolerance test has, in effect, been carried out (actually, this is the recommended procedure nowadays for screening of suspect patients, i.e., two hours post-prandial, instead of "fasting").

The test could easily be applied to a mass screening procedure for diabetes detection, using two technicians to facilitate the flow of the work.

The test is noted for its accuracy. The method is sufficiently accurate for a glucose tolerance test. In fact, it can be used interchangeably with the "standard" methods for all but the most exacting research.

Capillary blood may be used, thus doing away with the traumatic experience often undergone by obese patients (or infants and children) when a venipuncture is performed.

The test is further characterized by its low cost. With indigo disulfonate and indigo tetrasulfonate at $2.50 a gram (and much lower with the increased use of this reagent and in quantity—K and K Laboratories list the disulfonate at $12.50 for 10 grams, or $1.25 a gram) at the very least 25 tests could be done for 1 cent. This includes all reagents. Also, except for the stop-watch, all the glassware and other items of equipment are inexpensive.

The test could readily be carried out in isolated areas, even if electricity (for centrifuging) is unavailable, since the syringe-filter paper device may always be utilized. All that is ever needed is a means of boiling water.

In carrying out the blood sugar tests of the present invention, the following pieces of apparatus are employed:

(1) Kramer-Gittleman pipets.—These are sold calibrated at the 0.05, 0.10 and 0.50 cc. marks. Measure the distance in mm. between the 0.05 and 0.10 cc. graduations (about 30 to 35 mm.) multiply by 0.4, and make a light scratch at this distance above the 0.05 cc. point. Use an ampul file and fill in with a wax pencil. This measures "to contain" 0.07 cc.

(2) Serological pipets, such as Exax or "Blue Line."

a. 0.1 cc., graduated in 0.01 cc. intervals—for measuring the 10% sodium tungstate and the indigo disulfonate or other indigo sulfonate reagent (separate pipets for each purpose).

b. 0.1 cc., graduated in 0.01 cc. intervals—for use with the 30% NaOH. By the above-described ampul-file technique, mark at 0.043 cc.

c. 0.2 cc., graduated in 0.01 cc. intervals—for measuring the filtrate; but when only 0.05 cc. (or less) is required, a 0.1 cc. pipet, as in "a," is used.

d. 1 cc., graduated in 0.01 cc. intervals—for making up the indigo disulfonate or other indigo sulfonate reagent. Also, a 5 cc. pipet, graduated in 0.1 cc. intervals, for the same purpose.

(3) Test tubes, 10 x 75 mm., Pyrex.

a. Siliconized, with lip.

b. Plain, lipless.

(4) Beaker, 600 cc., Pyrex.

(5) "Alundum" boiling chips.

(6) Tirrill burner.

(7) Test tube holder.

(8) Stopwatch—use one graduated in 0.1 second intervals, and capable of being easily read to that unit.

(9) Glass mortar and pestle, 4 oz. size.

(10) Centrifuge tubes—heavy-duty, conical tip, 12 cc. size.

(11) Hypodermic syringe, 5 cc., siliconized and provided with two filter paper circles, Whatman No. 4. The circles are cut with a sharp cork borer, a size 6 most generally, and must fit closely. A size smaller cork borer is used to position the circles in place, cinching firmly, one after the other. This set-up is only required for Method 2, to be described hereinafter.

The following reagents are employed in the test:

(1) N/12 sulfuric acid—Dilute 83.3 cc. of N sulfuric acid to 1 liter and mix. Keeps indefinitely.

(2) 10% sodium tungstate—Weigh 10 grams of

Na₂WO₄.2H₂O to the nearest 0.05 gram, dissolve in water and make up to 100 cc. Keeps for six months. A corresponding amount of potassium tungstate could be substituted for the sodium tungstate.

(3) 30% sodium hydroxide—Weigh 30 grams of NaOH pellets rapidly into a beaker on a trip balance, dissolve in water, cool quickly, and make up to 100 cc. Store in either a Pyrex or a polyethylene bottle. Keeps for six months. A corresponding amount of potassium hydroxide could be substituted for the sodium hydroxide.

(4) Indigo disulfonate—Weigh 40 mg. of indigo disulfonate to the nearest 0.1 mg. Transfer to a 4 oz. glass mortar and add 0.5 cc. of water with a 1 cc. serological pipet. Use the glass pestle to make a paste and grind until all of the particles are wetted; this takes from 3 to 5 minutes. Add 0.5 cc. more of water and grind again for 2 minutes. Take care to avoid any loss by spattering. Then, using a 5 cc. serological pipet, add 13 cc. more of water—making a total of 14 cc. Mix on each addition; however, no further grinding is necessary. Transfer about 11 cc. to a heavy-duty, conical tip, 12 cc. size, centrifuge tube and centrifuge for 4 minutes at about 3000 r.p.m. to separate the glass particles (these appear as a white button at the tip of the tube). Decant the glass-free reagent, stopper, and store in the dark at room temperature. Avoid excessive exposure to light, i.e., for periods greater than 1 hour. Do not refrigerate. Keeps for one week.

(5) Diluting fluid—Place 60 cc. of N/12 sulfuric acid in a dry 100 cc. glass-stoppered cylinder. Pipet in 7.5 cc. of 10% sodium tungstate and then 16.5 cc. of N/10 sodium hydroxide. Make up to 100 cc. with water and mix. Keeps for six months.

"Water" is distilled water and all chemicals are C.P. grade.

The blood sugar test procedure is carried out in accordance with the following directives:

METHOD 1

0.56 cc. of N/12 sulfuric acid are placed in a 10 x 75 mm. siliconized test tube (with lip). Using a Kramer-Gittleman pipet, 0.07 cc. of capillary blood and lake are obtained and placed into the acid. 0.07 cc. of 10% sodium tungstate solution are added and the mixture shaken sharply three or four times. Then the tube is centrifuged for 30 seconds at about 3000 r.p.m. after which time 0.20 cc. of the clear supernatant is pipetted off and transferred to a second 10 x 75 mm. test tube (but plain and lipless) which already contains 0.0043 cc. of 30% sodium hydroxide solution. This is shaken twice gently, and 0.040 cc. of the indigo disulfonate reagent is added, followed by further mixing. The tube is then placed in a 600 cc. beaker of boiling water and a stopwatch is started. The time for the endpoint is observed as characterized by a bright-lemon glow; the reading is made to the nearest 0.1 second. The sugar value is obtained from the chart below:

Table I
[0.20 cc. filtrate—straight]

| Seconds | 32 | 31 | 30 | 29 | 28 | 27 | 26 | 25 | 24 | 23 | 22 | 21 | 20 | 19 | 18 |
|---|---|---|---|---|---|---|---|---|---|---|---|---|---|---|---|
| Mg. Percent Glucose | 80 | 85 | 90 | 95 | 100 | 105 | 110 | 120 | 130 | 140 | 150 | 185 | 225 | 275 | 340 |

Thus, 27.2 secs.=104 mg. percent; 19.4 secs.=255 mg. percent.

For values above 340 mg. percent, i.e., for "second" readings of less than 18, appropriate dilutions of the filtrate are prepared, using the diluting fluid as described above under reagents. Thus:

Table II
[0.10 cc. filtrate plus 0.10 cc. diluting fluid]

| Seconds | 28 | 27 | 26 | 25 | 24 | 23 | 22 | 21 | 20 | 19 | 18 |
|---|---|---|---|---|---|---|---|---|---|---|---|
| Mg. Percent Glucose | 200 | 210 | 220 | 240 | 260 | 280 | 300 | 370 | 450 | 550 | 680 |

Table III
[0.05 cc. filtrate plus 0.15 cc. diluting fluid]

| Seconds | 28 | 27 | 26 | 25 | 24 | 23 | 22 | 21 | 20 | 19 | 18 |
|---|---|---|---|---|---|---|---|---|---|---|---|
| Mg. Percent Glucose | 400 | 420 | 440 | 480 | 520 | 560 | 600 | 740 | 900 | 1,100 | 1,360 |

In this manner, using even smaller volumes of filtrate, values up to 2000 mg. percent can be readily measured. The basic calculation is, $$\frac{0.20}{\text{cc. of filtrate used}} \times \text{mg. percent from Table I} = \text{mg. percent glucose actually in blood specimen}$$

For values below 80 mg. percent, i.e., for stopwatch readings higher than 32 seconds, the endpoint is not sufficiently sharp. Therefore, only 0.020 cc. of indigo disulfonate reagent is used (plus 0.020 cc. of water). Then:

Table IV
[0.020 cc. reagent plus 0.020 cc. Water. 0.20 cc. filtrate—Straight]

| Seconds | 32 | 31 | 30 | 29 | 28 | 27 | 26 | 25 | 24 | 23 | 22 |
|---|---|---|---|---|---|---|---|---|---|---|---|
| Mg. Percent Glucose | 40 | 43 | 45 | 48 | 50 | 53 | 55 | 60 | 65 | 70 | 75 | and levels as low as 20 mg. percent (for extreme insulin shock) can be determined, using 0.010 cc. of the indigo disulfonate reagent plus 0.030 cc. of water:

Table V
[0.010 cc. Reagent plus 0.030 cc. Water. 0.20 cc. filtrate—Straight]

| Seconds | 32 | 30 | 28 | 26 | 25 | 24 | 23 | 22 |
|---|---|---|---|---|---|---|---|---|
| Mg. Percent Glucose | 20 | 23 | 25 | 28 | 30 | 33 | 35 | 38 |

The endpoint is very distinctive and sharp and, once seen, can never be mistaken. Actually, a series of color changes occur:

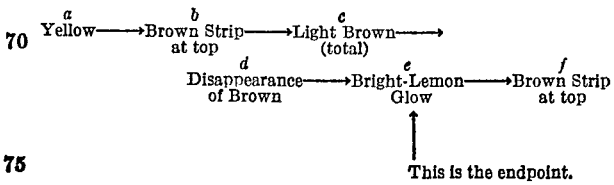

At the higher levels, stage "e," the disappearance of the brown actually starts before the browning is complete. However, the endpoint is taken when the entire solution glows—as from an incandescent light being turned on. One must wait for this glow. In essence, what happens here is the conversion of the indigo to indigo white, thus accounting for the glow. The reactions take place at about pH 13.

METHOD 2

This involves filtering, instead of centrifuging, after the addition of the tungstate. Thus, the precipitate after tungstate addition is transferred to a 5 cc. siliconized syringe provided with a double circle of filter paper and is filtered into a second 10 x 75 mm. siliconized test tube. The required 0.20 cc. of clear filtrate is pipetted off and then the regular indigo disulfonate-glucose reaction is carried out as in Method 1.

Method 1 is the technique of choice. The syringe-filter paper method is of value only when no centrifuge is available.

The method can also be used with indigo tetrasulfonate, employing just these modifications: The indigo tetrasulfonate is prepared in a concentration of 40 mg. in exactly 7.1 cc. of water. Merely stirring for 3 minutes with a small glass rod in a 50 cc. beaker suffices. The prepared reagent is stored in a refrigerator. As with the disulfonate, exposure to light should be minimized. The reagent is stable for two months. 0.036 cc. of reagent is used for the test, with a 0.1 cc. serological pipet calibrated for this purpose. The seconds vs. glucose values are identical with the disulfonate levels from 28 to 22 seconds, then diverge thus:

*Table VI*

| Seconds | 22 | 21 | 20 | 19 | 18 |
|---|---|---|---|---|---|
| Mg. Percent Glucose | 150 | 175 | 200 | 250 | 300 |

The higher levels (using less filtrate) change correspondingly.

The color changes and the endpoint are different, viz.,

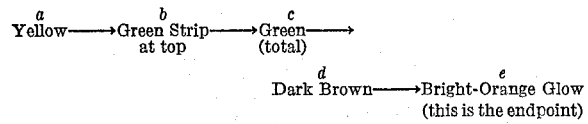

(this is the endpoint)

It is important that the following procedural steps be observed:

A supply of tubes, each with the 0.56 cc. of N/12 sulfuric acid and stoppered, is kept on hand. Also, the plain tubes, each containing the required 0.043 cc. of 30% NaOH, are similarly kept ready.

The tip of the pipet is placed just below the surface of the acid and all but the last bit of blood is gently expelled. The blood sings to the bottom. Then the pipet is rinsed twice with the clear supernatant acid. On the first rinse all but the last bit of fluid is expelled, followed by shaking gently two or three times to mix. When a "dichromate-acid cleaned" pipet is used, this technique is quantitative. The laking is complete only when the solution darkens. The tungstate should not be added before this.

The tip of the pipet is dipped into the solution at the end of the measurement, thus insuring the precision transfer of the disulfonate reagent. In fact, care must be taken to deliver the exact volumes of all pipetted solutions, using the normal precautions for measuring small volumes. In particular, with the viscous 30% NaOH, effort is made to avoid any loss (or smearing inside the test tube) via the outside of the pipet. The water should boil vigorously, but not so rapidly as to obscure the test solution, and the level should be such that the test tube may be immersed ¾ its length. The Alundum anti-bumping chips (from Arthur H. Thomas Co., Philadelphia), are a necessity.

Should repetition of the reaction be required and/or anticipated, as with the higher or lower sugar levels, then a greater volume of filtrate can be pipetted off the first time and the excess stored in a second siliconized tube or the original tube is re-centrifuged for just 15 seconds. A total of 0.40 cc. of filtrate is easily available.

The initial brown color (stage "c") possibly represents a step in the detachment of the sulfonic acid groups from the indigo molecule. However, there appears to be no adequate explanation for the second browning, stage "f." Possibly it could be a sort of "caramelization" of the indigo white, or of the glucose, or a further oxidation-reduction.

Should the endpoint ever be missed, this matter of the top of the solution immediately beginning to turn brown again thus serves as a built-in alarm. Note also, that at the lower sugar values there is a slight lag between the complete disappearance of the brown (stage "d") and the appearance of the bright-lemon glow; with elevated sugars, these two stages are almost simultaneous in occurrence, however.

It is understood, of course, that more specialized equipment and/or simplified volumes could be employed, viz., a. Pipets calibrated for just the volumes as specified; for example, "to contain" blood pipets marked at 0.07 cc.

b. Use of the more commonly encountered volumes, such as 0.05 cc. for the indigo reagent and 0.05 cc. for the 30% NaOH, with corresponding changes in the concentrations. However, were this to be done, then possibly a new set of values for the seconds vs. mg. percent glucose charts would have to be determined, even though these might only be slightly altered.

c. For individuals unfamiliar with pipetting, a set of micro syringes, calibrated at the designated values only, could be utilized. These could possibly prove faster to manipulate. One such supplier is the Hamilton Co., 1134 Whitley Street, Whittier, California. This firm manufactures "Miniature Delivery" precision syringes of 0.05 cc. and 0.10 cc. capacity and to 0.001 cc. tolerances; these are intended principally for radiochemical work, but ordinary unshielded syringes, of the same precision, could undoubtedly be provided.

d. In any case, a kit with all the necessary glassware, equipment and solutions, should be kept on hand.

For the indigo disulfonate reagent, the 0.1 cc. pipet should have the 0.01 cc. divisions at least 12 mm. apart.

Another 1 cc. serological pipet, graduated in 0.01 cc. intervals, is required for measuring the N/12 sulfuric acid. Several such pipettes, each marked with a wax pencil at 0.56 cc., should be kept on hand.

What is claimed is:

1. A blood sugar test comprising adding an alkali tungstate solution to an acidified capillary blood and lake sample, mixing, separating into two layers and alkalizing the supernatant in a test tube, mixing, adding to said tube an agent from the group consisting of indigo disulfonate and indigo tetrasulfonate, mixing, placing the tube in a beaker of boiling water and, with a stopwatch, ascertaining the time for the contents of the tube to reach a bright lemon glow indicator end point, in the event that indigo disulfonate is employed, and a bright orange glow indicator end point, in the event that indigo tetrasulfonate is employed, and determining the quantitative glucose content from a predetermined mg. percent glucose-seconds chart.

2. A blood sugar test of the type set forth in claim 1 wherein sodium tungstate is employed.

3. A blood sugar test of the type set forth in claim 1 wherein the blood and lake sample is acidified with sulfuric acid.

4. A blood sugar test of the type set forth in claim 1 wherein the supernatant is alkalized with sodium hydroxide.

5. A blood sugar test of the type set forth in claim 1 wherein the indigo sulfonate is indigo disulfonate.

6. A blood sugar test of the type set forth in claim 1 wherein the indigo sulfonate is indigo tetrasulfonate.

References Cited in the file of this patent

Allport: Colorimetric Analysis, pp. 218 to 225, 1947, 2nd impression.

Cohen: Indicators and Test Papers, 1st ed., 1899, pages 88–91, 196 and 197.